Sept. 13, 1932.  H. E. DISLER ET AL  1,876,639
HOSE CLAMP
Filed Sept. 12, 1930  2 Sheets-Sheet 1
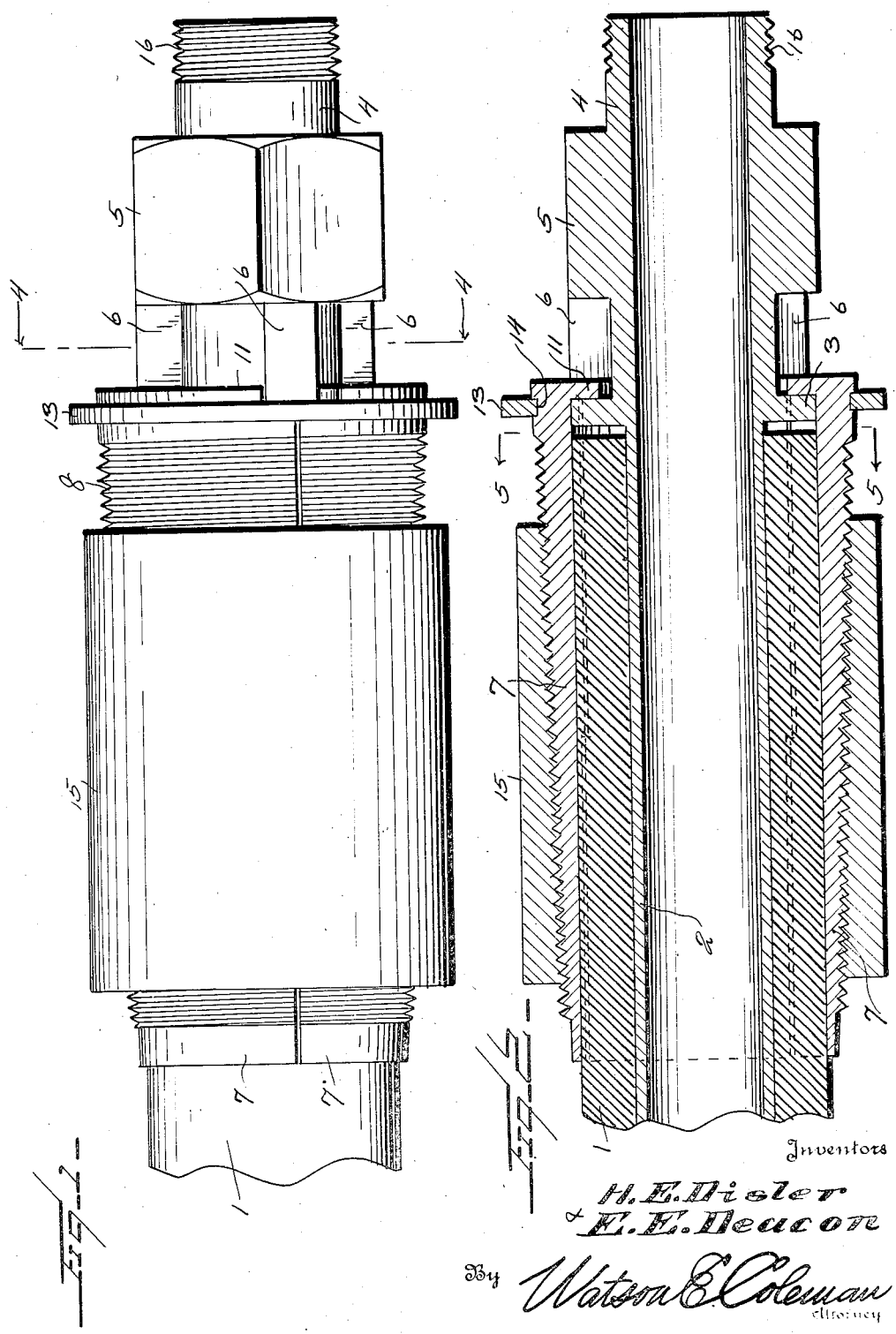

Sept. 13, 1932.      H. E. DISLER ET AL      1,876,639
HOSE CLAMP
Filed Sept. 12, 1930      2 Sheets-Sheet 2
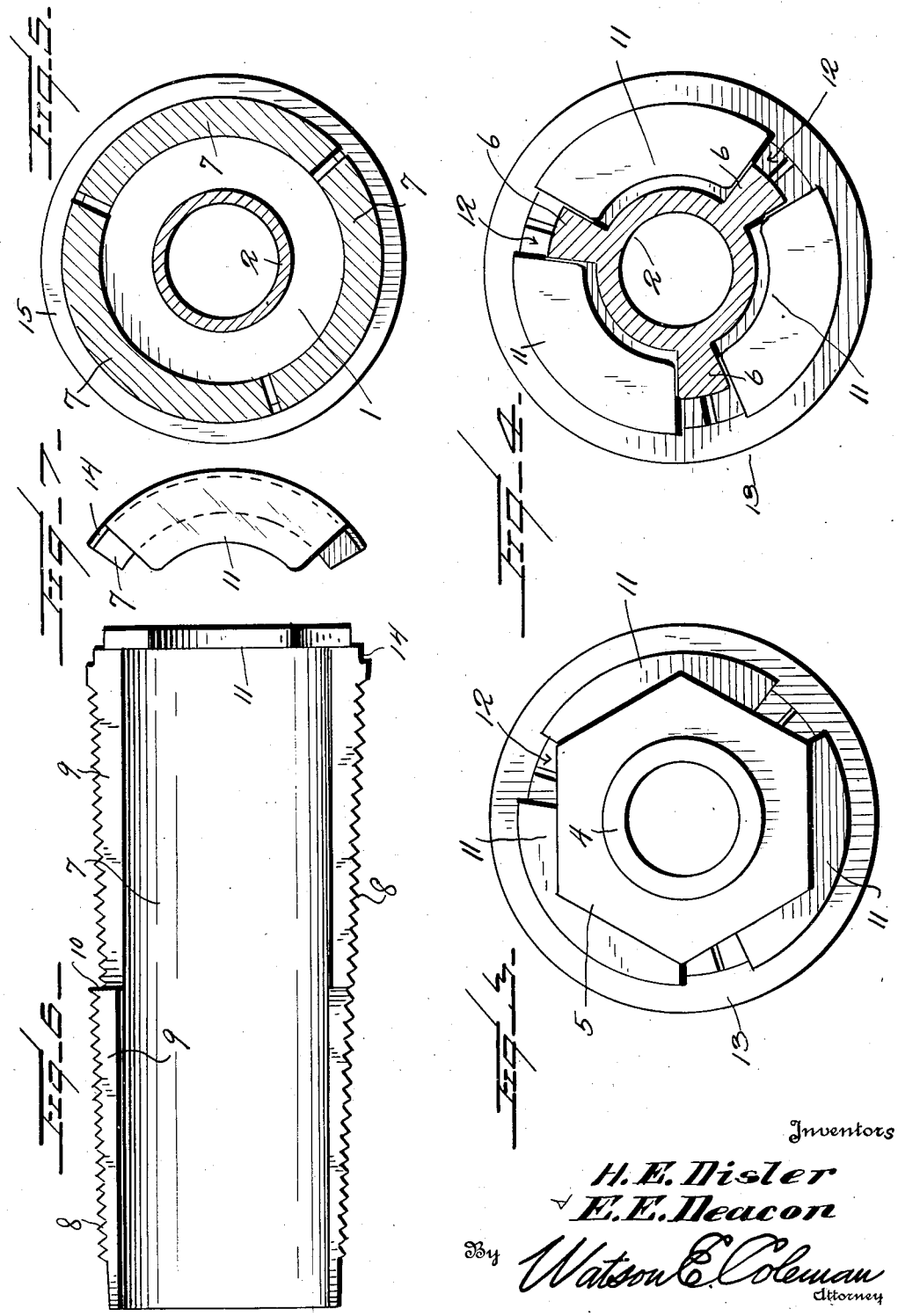

Patented Sept. 13, 1932

1,876,639

UNITED STATES PATENT OFFICE

HARRY E. DISLER, OF TULSA, AND ERL E. DEACON, OF OKLAHOMA CITY, OKLAHOMA

HOSE CLAMP

Application filed September 12, 1930. Serial No. 481,572.

This invention relates to improvements in hose clamps and pertains particularly to clamps for effecting the coupling of hose sections or for effecting the attachment of a hose nozzle to a hose section, particularly as applied to rotary well drilling.

The primary object of the present invention is to provide a hose clamp of much stronger design than the clamps of the character at present in use whereby the blowing out of the nozzle or coupling is prevented.

Still another object of the invention is to provide a hose clamp which is of such a design that changing of the couplings between hose sections may be effected much more quickly than can be done with other types of couplings.

A still further object of the invention is to provide a hose clamp having slips of improved design which will prevent the body of the hose being forced up in the recesses therebetween when the coupling is tightened onto the hose, so that weakness of the hose will not develop at the points where these recesses between the slips occur.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claim.

In the drawings:

Figure 1 is a view in side elevation of the hose clamp embodying the present invention showing the same applied.

Figure 2 is a longitudinal sectional view of the same.

Figure 3 is a view in end elevation of the clamp applied.

Figure 4 is a sectional view taken on the line 4—4 of Figure 1.

Figure 5 is a sectional view taken on the line 5—5 of Figure 2.

Figure 6 is an elevational view of the interior of a slip.

Figure 7 is a view in elevation of the outer end of a slip.

Referring more particularly to the drawings wherein like numerals of reference indicate corresponding parts throughout the several views, the numeral 1 indicates generally a portion of a hose at one end showing the coupling embodying the present invention applied thereto. As shown in the longitudinal sectional view this coupling comprises the tubular body 2 which is inserted into the end of the hose and which has adjacent its outer end the outwardly extending surrounding shoulder 3 which is brought to rest upon the end of the hose or in close proximity thereto as shown. The outer end of the tubular coupling beyond the shoulder 3 is slightly enlarged as indicated at 4 and has cast integral therewith the nut 5, while between the nut 5 and the shoulder 3 there are formed a series, preferably three, of longitudinally extending ribs 6 which serve to maintain the hereinafter described slips in assembled relation.

After the inner end portion of the tubular body 2, or in other words the part lying at the opposite side of the shoulder 3 from the end portion 4, has been inserted into the end of the hose 1 there is placed in position around the hose body the three slips 7. Each of these slips as shown comprises an elongated body arcuate in cross-section and having its outer face tapered and provided with screw threads 8. Each longitudinal edge of each slip is formed to provide the two sections 9 which are in parallel offset relation, being connected by the short circumferentially extending portion 10.

The adjacent edges of the three slips surrounding the hose are so designed that when the slips are placed in position they will interlock, that is the projecting portion of one longitudinal edge of a slip will extend into the recessed portion of the edge of the adjacent slip with the shoulders or circumferentially extending surfaces 10 sliding into abutting relation.

Each of the slips 7 has an inwardly extending shoulder 11 upon its upper end which shoulder is of a length less than the top edge of the slip so that when the slips are assembled as shown in Figure 4 there will remain between them the recesses 12 in each of which a rib 6 positions. Also, when the slips are in position these inwardly projecting shoulders 11 extend over the shoulder 3 of the tubular body 2 in the manner shown in Figure 2.

In assembling the slips 7 two thereof are first placed in position with their shoulders 11 overlapping the shoulder 3 of the tubular body, the adjacent longitudinal edges of the slips being interlocked. With the two slips in this position there is then moved up over the slips a retaining ring 13 which has been previously placed over the end of the hose. This ring is moved to a position adjacent the outer ends of the slips where it engages in a groove seat 14 formed circumferentially thereabout. By then moving the slips forwardly slightly and tilting the same outwardly the third slip may have its shoulder end placed in position in the ring after which all of the slips may be dropped back into position upon the tube where they will be held by the retaining ring 13.

Previous to placing the tubular body 12 in the hose end there is slipped thereover the interiorly threaded draw collar 15 which, after assembling the slips 7 in the manner described, is then moved up over the tapered ends of the slips until it engages with the threads thereof, which threads are, of course, so formed as to properly align when the slips are arranged in position, and tightened up on the slips so that they will be drawn in to firmly compress the hose end against the tubular body 2. When the draw collar 3 is being tightened up the tubular body or coupling 2 may be held by a wrench engaging the nut 5. The ribs 6 engaging between the shoulders 11 of the slips act to prevent the slips turning about the hose end and about the shoulder 3 over which their shoulders engage.

From the foregoing it will be readily seen that by constructing the slips in the manner described a tight union may be formed between the same and the hose, clamping the latter firmly against the tubular body, without forcing the hose up into the openings between the slips.

The outer end of the portion 4 of the tubular body is exteriorly threaded as indicated at 16 so that a suitable coupling may be connected between the hose clamps to connect two hose sections or to connect a hose with a pump.

While, of course, the clamp herein described has been designed primarily for use in connection with rotary drilling rigs it will be apparent that it may be used for connecting sections of hose used for other purposes. Therefore, it is not intended that this clamp be restricted in its use to well drilling operations.

Having thus described our invention, what we claim is:

A hose clamp, comprising a tubular body designed to have one end extended into an end of a hose, a shoulder formed integral with and about said body inwardly of the other end for engagement with the hose end, a plurality of slips comprising elongated bodies of arcuate cross section, disposed longitudinally of the hose and surrounding the same, a flange formed integral with each slip at one end and projecting inwardly, each flange of each slip terminating at each end short of the adjacent longitudinal edge of the slip, said flanges being designed to overlie and engage said shoulder, longitudinally extending ribs formed integral with said tubular body and each engaging between the ends of a pair of flanges and preventing the turning of said slips on the hose, a sleeve surrounding and having threaded engagement with said slips for securing the same in position about the hose, each of said slips having a groove formed about the outer face thereof at the end adjacent the flange, and a ring member adapted to engage in the grooves of the slips to couple the same together.

In testimony whereof we hereunto affix our signatures.

HARRY E. DISLER.
ERL E. DEACON.